| United States Patent [19] | [11] Patent Number: 4,906,733 |
| Kodama et al. | [45] Date of Patent: * Mar. 6, 1990 |

[54] PROCESS FOR PREPARING COLORLESS ROSIN

[75] Inventors: Yoshihiro Kodama, Kobe; Masao Maeda, Nishinomiya; Kiyoshi Kanagawa, Osaka, all of Japan

[73] Assignee: Arakawa Kagaku Kogyo Kabushiki Kaisha, Osaka, Japan

[*] Notice: The portion of the term of this patent subsequent to Jul. 11, 2006 has been disclaimed.

[21] Appl. No.: 248,704

[22] Filed: Sep. 23, 1988

Related U.S. Application Data

[63] Continuation-in-part of Ser. No. 149,307, Jan. 28, 1988, Pat. No. 4,847,010.

[30] Foreign Application Priority Data

Jan. 29, 1987 [JP] Japan .................................. 62-19329
Sep. 26, 1987 [JP] Japan ................................. 62-242241

[51] Int. Cl.$^4$ ............................ C09F 7/00; C09F 1/04
[52] U.S. Cl. .................................... 530/216; 530/222; 530/223; 530/227
[58] Field of Search ...................... 260/100, 97.7, 107; 530/216

[56] References Cited

U.S. PATENT DOCUMENTS 4,248,770  2/1981  Matsuo et al. ...................... 260/104
4,302,371  11/1981  Matsuo et al. ...................... 260/28.5

FOREIGN PATENT DOCUMENTS 484357  5/1938  United Kingdom .

*Primary Examiner*—Harold D. Anderson
*Attorney, Agent, or Firm*—Armstrong, Nikaido, Marmelstein, Kubovcik & Murray

[57] ABSTRACT

A process for preparing a colorless rosin comprising a step for purifying a disproportionated rosin and hydrogenating the rosin. According to the process, a rosin having a color nearly equal to colorless and is excellent in various properties such as odorless at heating and stability is prepared.

3 Claims, No Drawings

PROCESS FOR PREPARING COLORLESS ROSIN

CROSS REFERENCE TO RELATED APPLICATION

This is a continuation-in-part of application Ser. No. 149,307, filed Jan. 28, 1988, now U.S. Pat. No. 4,847,010.

BACKGROUND OF THE INVENTION

The present invention relates to a process for preparing a colorless and odorless rosin having an excellent thermal stability.

Heretofore, a rosin has been used as tackifiers for hot-melt adhesives and pressure-sensitive adhesives, modifiers for rubbers and plastics, raw materials for traffic paints, paper sizing agents, emulsifiers for synthetic rubbers, resins for inks, resins for paint, and the like. The rosin is colored in yellow or yellowish brown, impart its characteristic odor and has the defects that the rosin is poor in thermal stability and weatherability (hereinafter referred to thermal stability and weatherability as stability).

Accordingly, in order to prepare a colorless rosin having an improved stability which can be preferably used in an end product having improved qualities, a process for improving thermal stability of a rosin by disproportionating an unpurified rosin and a process for hydrogenating an unpurified rosin are employed. As a result, a disproportionated rosin and a hydrogenated rosin which are somewhat improved in stability are developed and are commercially available. However, the rosin sufficiently satisfied with color and stability has not yet been provided.

Japanese Examined Patent Publication No. 33771/1970 and Japanese Examined Patent Publication No. 20599/1974 disclose a method for disproportionating rosins with a specific organic sulfur compound. However, the disproportionated rosins do not have sufficient color and stability and impart odor.

As mentioned above, any conventional rosins, disproportionated rosins and hydrogenated rosins have not yet been satisfactory in odor, color and stability at a time. Accordingly, it has been desired that a rosin being colorless and odorless and having an excellent stability is developed in the field of art.

The object of the present invention is to develop a novel process for preparing a rosin having improved properties such as color, odor and stability in comparisonn with those of conventional rosins.

In the course of studying to solve the above-mentioned problems of the conventional rosins, it has been found that, all of the above-mentioned problems can be solved when a disproportionated rosin is used as a raw material and is subjected to purification and to hydrogenation in an optional order, and that the process is a very simple and novel process for producing a rosin having almost colorless, excellent properties such as odorless at heating and stability. The present invention is accomplished in accordance with the above novel knowledge.

These and other objects of the invention will become apparent from the description hereinafter.

SUMMARY OF THE INVENTION

In accordance with the present invention, there is provided a process for preparing a colorless rosin, comprising subjecting a disproportionated rosin to purification and to hydrogenation.

DETAILED DESCRIPTION

The present invention relates to a novel process for preparing a rosin having a color nearly equal to colorless and being odorless at heating and excellent in stability without any addition of stabilizer such as oxidation inhibitor or coloring inhibitor. In accordance with the process for preparing a rosin, there is provided a rosin which cannot be expected from the conventional fixed though which is derived from the properties of rosins that rosins are colored in yellow or yellowish brown. Further, the prepared rosin has a characteristic of a rosin derivative, that is, high compatibility with various polymers.

It is thought that the reason why a rosin is colored is as follows:

(1) High molecular weight materials and unsaponifiable materials are contained in the raw rosin.

(2) A resin acid having a conjugated double bond which exhibits a high oxygen absorbing property, such as abietic acid is contained in the rosin.

From the viewpoint of the above-mentioned reasons, in the process of the present invention, a disproportionated rosin is used as a raw material and the process of purification and hydrogenation of the rosin are adopted. the purification and hydrogenation can be carried out in an optional order, that is, after the purification of the disproportionated rosin, the rosin can be hydrogenated, and after the hydrogenation of the disproportionated rosin, the rosin can be purified. If necessary, after the disproportionated rosin is purified and hydrogenated, the rosin can be purified again.

In the present invention, it is indispensable to use a rosin stabilized by disproportionation as a raw material. Accordingly, when a rosin is merely purified and hydrogenated, or when a rosin is merely hydrogenated and purified, a desired rosin having excellent properties can not be obtained.

It is also indispensable to subject the disproportionated rosin to purification and hydrogenation. Accordingly, when the unpurified disproportionated rosin is merely hydrogenated, or when the disproportionated rosin is merely purified, a desired rosin having excellent properties which are required in the present invention can not be obtained. When the rosin is disproportionated and hydrogenated after the rosin is purified, a desired rosin can not be obtained because the rosin is oxidized during the disproportionation.

The process of the present invention is explained hereinafter in detail.

A disproportionated rosin which is used as a starting material in the process of the present invention can be easily prepared by a conventional disproportionating manner of a rosin. That is, the disproportionated rosin is prepared by heating a rosin in the presence of a disproportionating catalyst. Examples of the rosin are, for instance, gum rosin, wood rosin and tall oil rosin, of which main component is a resin acid such as abietic acid, palustric acid, neoabietic acid, pimaric acid, isopimaric acid or dehydroabietic acid. As the disproportionating catalyst, various conventional catalysts, for instance, poweder of metals such as nickel and platinum; iodine; iodides such as iron iodide; palladium carbon, and the like can be exemplified. The catalyst is employed in an amount of 0.01 to 3% by weight, preferably 0.05 to 1.0% by weight on the basis of the amount of the rosin employed. The reaction temperature is 100° to 300° C., preferably 150° to 290° C. The heating period of time is 1 to 8 hours, preferably 2 to 5 hours.

A part of resin acids contained in a rosin can be also disproportionated by heating the rosin at a temperature of 250° to 300° C. for 1 to 5 hours without a catalyst, and the heat treated disproportionated rosin can also be preferably used as a disproportionated rosin in the process of the present invention.

In the present invention, the process of purification is indispensable. The terminology "purification" is intended to mean that removing high molecular materials which are presumed to be formed from peroxides contained in the disproportionated rosin and unsaponifiable materials which are originally contained in the disproportionated rosin. The purification can be carried out according to usual purification methods such as distillation, crystallization, extraction, and the like. From the viewpoint of purifying the rosin industrially, it is preferable that the rosin is purified by distillation. In case that the rosin is purified by distillation, usually a temperature of 200° to 300° C. and a pressure of 1 to 10 mmHg are employed in consideration of the period of time for distilling. In case that the rosin is purified by crystallization, the crystallization is carried out by preparing a solution of the disproportionated rosin in a good solvent, removing the good solvent to concentrate the rosin and then adding a poor solvent thereto. Examples of the good solvent are, for instance, benzene, toluene, xylene, chloroform, lower alcohols, ketones such as acetone, lower alkyl acetates such as ethyl acetate, and the like. Examples of the poor solvent are, for instance, n-hexane, n-heptane, cyclohexane, isooctane, and the like. Further, the purified rosin can be also produced by preparing an alkaline solution of the rosin with an alkaline aqueous solution, extracting unsaponifiable materials which are not dissolved in the alkaline aqueous solution with an organic solvent and then neutralizing the extracted aqueous layer.

In the present invention, the process of hydrogenation is indispensable. The hydrogenation can be carried out according to usual conditions. For instance, the hydrogenation can be carried out by heating the purified disproportionated or unpurified disproportionated rosin in a closed vessel in the presence of a hydrogenating catalyst under an initial pressure of hydrogen of 50 to 200 Kg/cm$^2$ at a temperature of 100° to 300° C., preferably 200° to 280° C. In the process of the present invention, there is no restriction in the kinds of the hydrogenation catalysts, and conventional hydrogenation catalysts can be employed. Examples of the hydrogenation catalyst are, for instance, palladium carbon, rhodium carbon and powders of metal such as nickel or platinum. The amount of the hydrogenation catalyst is 0.01 to 3% by weight, preferably 0.05 to 1% by weight based upon the amount of the disproportionated rosin employed.

The rosin prepared by the process of the present invention has a color almost nearly equal to colorless and is superior in properties such as odorless at heating, stability and compatibility with polymers. Accordingly, the prepared rosin can be suitably employed as a modifier used in a soap composition for cleaning. Further, an alkali metal salt of the rosin can be suitably used as an emulsifier for a production of a synthetic rubber or in an emulsion polymerization. Also, rosin esters which are prepared by esterifying the rosin with a polyhydric alcohol such as glycerol or pentaerythritol can be suitably employed as a tackifier used in hot-melt adhesives and pressure-sensitive adhesives, a modifiers used in rubbers and plastics, a raw material of traffic paints, a base material of chewing gum, a modifier of inks or paints, a coating material for pigments, a flux for solders, and the like. The qualities of the end products in which the rosin is employed can be remarkably improved.

The process for preparing a rosin of the present invention is more particularly described and explained by means of the following Examples and Comparative Examples. It is to be understood that the present invention is not limited to the Examples.

EXAMPLE 1

(1) Disproportionation reaction

To 1000 g. of unpurified gum rosin from China having an acid value of 171, a softening point (measured by ring and ball method prescribed in JIS-K 5902, hereinafter the same) of 74° C. and a Gardner color of 6 was added 0.3 g. of palladium charcoal in which 5% by weight of palladium and 50% by weight of water were contained (hereinafter referred to as "a 5% palladium charcoal") as a catalyst. The mixture was subjected to disproportionation by agitating at 280° C. for 4 hours in an atmosphere of nitrogen to give a disproportionated rosin having an acid value of 158, a softening point of 77.0° C. and a Gardner color of 7.

(2) Purification

The above-mentioned disproportionated rosin was distilled under a pressure of 3 mmHg in an atmosphere of nitrogen and under the conditions shown in Table 1 to give a purified disproportionated rosin in a main fraction. The results are shown in Table 1.

TABLE 1

|  | Distilling temperature (°C.) | Still pot temperature (°C.) | Acid value | Yield (%) |
|---|---|---|---|---|
| Initial fraction | <195 | <210 | 56.5 | 5.1 |
| Main fraction | 195 to 250 | 210 to 280 | 176.3 | 86.3 |
| Residue | ≧250 | ≧280 | 32.1 | 8.6 |

(3) Hydrogenation

Two hundred grams of the purified disproportionated rosin obtained in the above (2) Purification and 0.4 g of a 5% palladium charcoal having a water content of 50% were fed into a shaking type autoclave having a content volume of 1 l. and then oxygen was removed from the autoclave. The rosin contained in the autoclave was compressed with hydrogen under a pressure of 50 Kg./cm$^2$ and was heated up to 255° C. Then, the rosin was subjected to hydrogenation at 255° C. for 3 hours to give 197 g. of a hydrogenated rosin having an acid value of 175.9, a softening point of 86.0° C. and a Gardner color of not more than 1 (Hazen color of 50).

EXAMPLE 2

The unpurified disproportionated rosin obtained in (1) Disproportionation of Example 1 was hydrogenated in the same manner as described in the (3) Hydrogenation of Example 1. The obtained rosin was distilled in the same manner as described in the (2) Purification of Example 1 to give a 150 g of a purified disproportionated rosin in a main fraction having an acid value of 174.5, a softening point of 85.0° C. and a Garnder color of not more than 1 (Hazen color 150).

COMPARATIVE EXAMPLE 1

The gum rosin from China which was employed in the (1) Disproportionation reaction of Example 1 was distilled in the same manner as described in the (2) Purification of Example 1 under the conditions shown in Table 2 to give a purified rosin having an acid value of 180.4, a softening point of 80° C. and a Gardner color of 4.

TABLE 2

|  | Distilling temperature (°C.) | Still pot temperature (°C.) | Acid value | Yield (%) |
|---|---|---|---|---|
| Initial fraction | <195 | <210 | 58.4 | 4.7 |
| Main fraction | 195 to 250 | 210 to 280 | 180.4 | 86.9 |
| Residue | ≧250 | ≧280 | 32.5 | 8.4 |

Two hundred grams of the obtained purified rosin was subjected to hydrogenation in the same manner as described in the (3) Hydrogenation of Example 1 to give 197 g. of a rosin having an acid value of 179.5, a softening point of 83.0° C. and a Gardner color of 2.

COMPARATIVE EXAMPLE 2

The gum rosin from China which was employed in the (1) Disproportionation of Example 1 was subjected to hydrogenation in the same manner as described in the (3) Hydrogenation of Example 1 and then the rosin was purified in the same manner as described in the (2) Purification of Example 1 to give a purified rosin having an acid value of 176.0, a softening point of 84.0° C. and a Gardner color of 3.

COMPARATIVE EXAMPLE 3

The unpurified disproportionated rosin obtained in the (1) Disproportionation of Example 1 was subjected to purification in the same manner as described in the (2) Purification of Example 1 to give a purified rosin having an acid value of 173.4, a softening point of 81.5° C. and a Gardner color of 4.

COMPARATIVE EXAMPLE 4

The unpurified disproportionated rosin obtained in the (1) Disproportionation of Example 1 was hydrogenated in the same manner as described in the (3) Hydrogenation of Example 1 to give 196 g of an unpurified rosin having an acid value of 157.3, a softening point of 79.0° C. and a Gardner color of 4.

COMPARATIVE EXAMPLE 5

The purified rosin obtained in Comparative Example 1 was disproportionated and then was subjected to hydrogenation in the same manner as described in the (1) Disproportionation and (3) Hydrogenation of Example 1 to give 502 g of a disproportionated rosin having an acid value of 165, a softening point of 81.0° C. and a Gardner color of 3.

The rosin obtained in Examples 1 and 2 and Comparative Examples 1 to 5 were subjected to the following tests.

TEST FOR THERMAL STABILITY

In a glass test tube having an inner diameter of 1.5 cm and a height of 15 cm was put 10 g of the sample. The test tube was allowed to stand in an air-circulating oven at 180° C. without sealing. The change in the color (Gardner) of the rosin was observed at regular intervals. The results are shown in Table 3.

TEST FOR WEATHERABILITY

A Petri dish having an inner diameter of 5.6 cm and a height of 1 cm was charged with 2.0 g. of the rosin having a particle size of 60 to 100 meshes. The Petri dish was irradiated with a 400 watt mercury lamp (Type: H400F, commercially available from TOSHIBA CORPORATION) at a distance of 40 cm for 15 hours. The amount of gained weight of in the rosin (oxygen absorption) was measured and the change in the color (Gardner) of the resin was observed. The color was observed when the rosin was dissolved into toluene to give a 50% toluene solution of the rosin. The results are shown in Table 3.

TABLE 3

|  | Thermal Stability | | | Weatherability | | |
|---|---|---|---|---|---|---|
|  | 0 hr. | 4 hr. | 10 hr. | 24 hr. | Amount of oxygen absorption (% by weight) | Gardner color 0 hr. | 24 hr. |
| Ex. No. | | | | | | | |
| 1 | <1 | 2 | 4 | 7 | 0.06 | <1 | <1 |
| 2 | <1 | 3 | 6 | 9 | 0.10 | <1 | 1 |
| Com. Ex. No. | | | | | | | |
| 1 | 2 | 6 | 11 | 14 | 0.43 | 1 | 3 |
| 2 | 3 | 7 | 12 | 15 | 0.63 | 2 | 5 |
| 3 | 4 | 7 | 9 | 12 | 0.45 | 3 | 4 |
| 4 | 4 | 9 | 12 | 14 | 0.15 | 3 | 5 |
| 5 | 3 | 5 | 8 | 11 | 0.12 | 2 | 3 |

As is clear from the results shown in Table 3, the thermal stability of the rosins of Examples 1 and 2 prepared according to the present invention are superior to those of the rosins of Comparative Examples 1 to 5. Furthermore, the color of the rosins of Examples 1 and 2 are nearly equal to colorless although the rosins are subjected to a test for weatherability. Further, the rosins of Examples 1 and 2 did not impart odor at heating.

In addition to the ingredients used in the Examples, other ingredients can be used in the Examples as set forth in the specification to obtain substantially the same results.

What is claimed is:

1. A process for preparing a colorless rosin comprising a step for purifying a disproportionated rosin and a step for hydrogenating the rosin.

2. The process of claim 1, wherein after purifying the disproportionated rosin, hydrogenating the purified rosin.

3. The process of claim 1, wherein said disproportionated rosin is prepared by disproportionating at least one rosin selected from the group consisting of gum rosin, wood rosin and tall oil rosin.

* * * * *